United States Patent
Fujita

(10) Patent No.: US 9,404,462 B2
(45) Date of Patent: Aug. 2, 2016

(54) ENGINE STARTER DESIGNED TO MINIMIZE MECHANICAL NOISE AT START OF ENGINE

(71) Applicant: DENSO CORPORATION, Kariya, Aici-pref. (JP)

(72) Inventor: Tatsuya Fujita, Obu (JP)

(73) Assignee: DENSO CORPORATION, Kariya (JP)

( * ) Notice: Subject to any disclaimer, the term of this patent is extended or adjusted under 35 U.S.C. 154(b) by 267 days.

(21) Appl. No.: 14/054,255

(22) Filed: Oct. 15, 2013

(65) Prior Publication Data

US 2014/0102395 A1   Apr. 17, 2014

(30) Foreign Application Priority Data

Oct. 17, 2012  (JP) ................ 2012-229567

(51) Int. Cl.
| | | |
|---|---|---|
| F02D 28/00 | (2006.01) | |
| F02N 11/08 | (2006.01) | |
| F02N 15/06 | (2006.01) | |

(52) U.S. Cl.
CPC .......... *F02N 11/0814* (2013.01); *F02N 11/087* (2013.01); *F02N 11/0844* (2013.01); *F02N 11/0855* (2013.01); *F02N 15/067* (2013.01); *F02N 11/0848* (2013.01); *F02N 2200/022* (2013.01); *Y02T 10/48* (2013.01)

(58) Field of Classification Search
CPC ............ F16H 61/0021; F16H 61/0031; F16H 61/0206; F02N 11/0814; F02N 11/0844; F02N 11/0855; F02N 11/087; F02N 15/067
USPC ........... 123/179.1, 179.3; 701/113; 290/38 R, 290/38 C
See application file for complete search history.

(56) References Cited

U.S. PATENT DOCUMENTS

| | | | | |
|---|---|---|---|---|
| 3,857,043 A | * | 12/1974 | Habasch ............. | F02N 11/0848 123/179.3 |
| 2009/0301588 A1 | * | 12/2009 | Shimizu ............. | F16H 61/0021 137/625.64 |
| 2010/0028168 A1 | * | 2/2010 | Shimizu ................ | F04B 17/044 417/213 |
| 2010/0050970 A1 | * | 3/2010 | Okumoto ............ | F02N 11/0844 123/179.4 |
| 2010/0257975 A1 | * | 10/2010 | Niimi .................... | F02N 11/087 74/7 C |

(Continued)

FOREIGN PATENT DOCUMENTS

| | | |
|---|---|---|
| JP | A-2003-83212 | 3/2003 |
| JP | 2008-121648 A | 5/2008 |

OTHER PUBLICATIONS

Dec. 22, 2015 Office Action issued in Japanese Patent Application No. 2012-229567.

*Primary Examiner* — Hai Huynh
*Assistant Examiner* — Gonzalo Laguarda
(74) *Attorney, Agent, or Firm* — Oliff PLC

(57) ABSTRACT

An engine starting system for an engine is equipped with a pinion, an electromagnetic actuator, and a controller. When energized, the electromagnetic actuator produces a magnetic attraction to move the pinion straight toward a ring gear coupled to an engine for starting the engine. The controller is designed to selectively provide a small amount of current to the electromagnetic actuator and a large amount of current to the electromagnetic actuator. When it is required to minimize the level of noise arising from mechanical contact of the pinion with the ring gear, the controller provides the small amount of current to the electromagnetic actuator to slow the movement of the pinion toward the ring gear, thereby lessening the impact of the pinion on the ring gear.

10 Claims, 6 Drawing Sheets

(56) References Cited

U.S. PATENT DOCUMENTS

| | | | |
|---|---|---|---|
| 2011/0088990 A1* | 4/2011 | Shimizu | F16H 61/0206 192/85.01 |
| 2011/0118962 A1* | 5/2011 | Couetoux | F02N 11/0844 701/113 |
| 2012/0144818 A1* | 6/2012 | Shimizu | F04B 17/03 60/459 |

* cited by examiner

ENGINE SPEED

PINION-MOVING INSTRUCTION

MOTOR-DRIVING INSTRUCTION

CURRENT-REDUCING INSTRUCTION

BATTERY VOLTAGE

MOTOR-DRIVING CURRENT

PINION-MOVING CURRENT

FIG.5(a) ENGINE SPEED
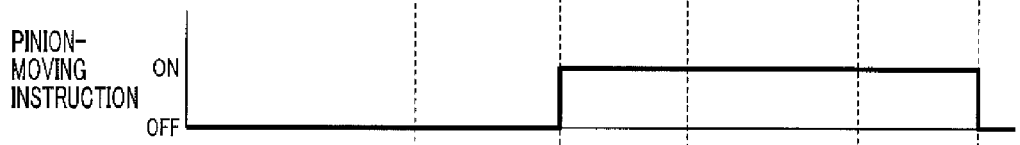
FIG.5(b) PINION-MOVING INSTRUCTION
FIG.5(c) MOTOR-DRIVING INSTRUCTION
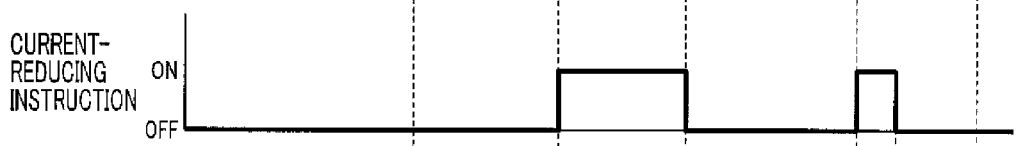
FIG.5(d) CURRENT-REDUCING INSTRUCTION
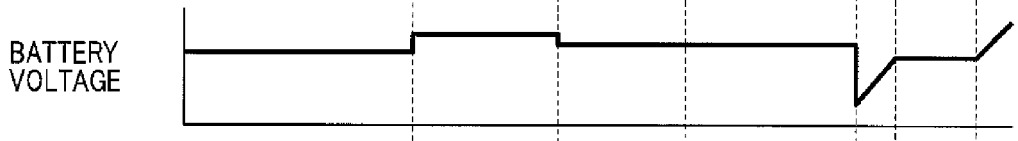
FIG.5(e) BATTERY VOLTAGE
FIG.5(f) MOTOR-DRIVING CURRENT
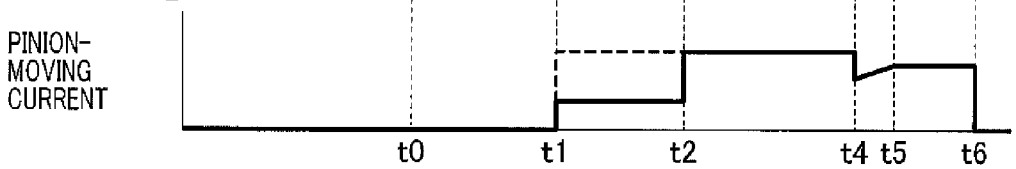
FIG.5(g) PINION-MOVING CURRENT

ENGINE STARTER DESIGNED TO MINIMIZE MECHANICAL NOISE AT START OF ENGINE

CROSS REFERENCE TO RELATED DOCUMENT

The present application claims the benefit of priority of Japanese Patent Application No. 2012-229567 filed on Oct. 17, 2012, the disclosure of which is incorporated herein by reference.

BACKGROUND OF THE INVENTION

1. Technical Field

This disclosure relates generally to an engine starting system equipped with, for example, a starter and an electronic control unit (ECU), and more particularly to such a system designed to minimize mechanical noise generated when a pinion is moved in a straight line and then contacts with a ring gear of an engine.

2. Background Art

Typical engine starting systems for internal combustion engines are equipped with an electric motor, a starter, and an electronic control unit (ECU). The electric motor works to produce torque for starting the engine. The starter is equipped with an electromagnetic relay which energizes or deenergizes the electric motor and also moves a pinion straight to a ring gear coupled to the engine. The ECU works to control the operations of the starter.

Specifically, the electromagnetic relay produces a magnetic attraction to move the pinion in an axial direction thereof into contact with the ring gear and then mesh the pinion with the ring gear. The mechanical noise is, therefore, created upon the contact of the pinion with the ring gear. Such a noise will also be referred to herein as an axial impact noise.

With the growth of hybrid vehicles or automotive idle stop systems (also called automatic engine start/restart system), there is an increased demand for quietness in the vehicles. Measures against the axial impact noise are, therefore, called for.

Japanese Patent First Publication No. 2003-083212 teaches an engine starting system which works to start actuating an electric motor at a low speed simultaneously with start of thrusting a pinion toward a ring gear coupled to the engine and then rotate the electric motor at a high speed to start the engine after the pinion meshes with the ring gear completely. This system serves to reduce mechanical noise (which will also be referred to as a radial impact nose below) arising from contact of a tooth plane of the pinion with that of the ring gear, but however, it is not engineered to reduce the axial impact noise.

SUMMARY OF THE INVENTION

It is therefore an object of this disclosure to provide an engine starting system designed to minimize an axial impact noise occurring when a pinion moves in an axial direction thereof toward a ring gear coupled to an engine and then contacts with the ring gear.

According to one aspect of the invention, there is provided an engine starting system for an engine which may be employed in automatic engine stop/restart systems for automotive vehicles. The engine starting system comprises: (a) a pinion which is moved straight into engagement with a ring gear coupled to an engine and works to rotate the pinion to start the engine; (b) an electromagnetic solenoid which is equipped with a coil, when the coil is energized, the electromagnetic solenoid producing a magnetic attraction to move the pinion straight toward the ring gear; (c) a first current increasing and decreasing unit that is a component of an electric circuit including the coil of the electromagnetic solenoid, the first current increasing and decreasing unit working to selectively increase and decrease an amount of current used to energize the coil; and (d) a controller which works to output a first current-reducing instruction to the first current increasing and decreasing unit to reduce the amount of current used to energize the coil. This results in a decrease in degree of the magnetic attraction, as produced by the coil, which leads to a decrease in speed at which the pinion moves, thereby reducing an axial impact noise which arises from In the preferred mode of the embodiment, the controller is designed to operate in a preset mode in which the first current-reducing instruction is outputted to bring the pinion into engagement with the ring gear before a stop of the engine in an idle stop mode. The controller outputs the first current-reducing instruction to the first current increasing and decreasing unit to reduce the amount of current used to energize the coil when performing the preset mode.

In the preset mode, a fuel supply system is usually deactivated to cut the supply of fuel to the engine. Vehicle occupants will, therefore, be sensitive to the axial impact noise. In order to reduce such a noise, when entering the preset mode, the controller outputs the current-reducing instruction to the current increasing and decreasing unit to decrease the amount of current supplied to the coil to slow the movement of the pinion, thereby reducing the level of the axial impact nose.

When an engine restart request is made to start the engine during execution of the preset mode, the controller may stop outputting the first current-reducing instruction to the first current increasing and decreasing unit. This results in an increase in amount of current supplied to the coil which increases the speed at which the pinion moves straight, thus accelerating the start of the engine instead of minimizing the axial impact noise.

The engine starting system may also include an electric motor which serves to torque to rotate the pinion and a second current increasing and decreasing unit that is a component of an electric circuit including an armature of the electric motor and which selectively increase and decrease an amount of current to be supplied to the armature. The controller outputs a second current-reducing instruction to the second current increasing and decreasing unit to reduce the amount of current to be supplied to the armature. This avoids the inrush current to the armature, thus minimizing an instantaneous drop in voltage at a power supply such a battery mounted in the vehicle and also reduces the radial impact noise, as discussed in the introductory part of this application.

The component of the electric circuit which constitutes the first current increasing and decreasing unit and the component of the electric circuit which constitutes the second current increasing and decreasing unit may be implemented by a common circuit component. The controller outputs a current-reducing instruction to the common circuit component as the first and second current-reducing instructions to reduce the amount of current used to energize the coil and the amount of current supplied to the armature. This results in a decrease in production cost of the engine starting system as compared with when the first current increasing and decreasing unit and the second current increasing and decreasing unit are designed to be separate from each other.

The component of the electric circuit which constitutes the first current increasing and decreasing unit may be made up of a higher-resistance branch line and a lower-resistance branch line which have resistances different from each other and are connected in parallel to each other. The lower-resistance branch line has a switch disposed therein. The controller works to open the switch to have an electric current pass through the higher-resistance branch line to decrease the amount of current used to energize the coil.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIGS. 5(a) to 5(g) are time charts for demonstrating operations of the engine starting system of FIG. 2 in the case where a pinion engages a ring gear in a preset mode, after which an engine restart request is made before complete stop of an engine.

DESCRIPTION OF THE PREFERRED EMBODIMENTS

Figure 1:
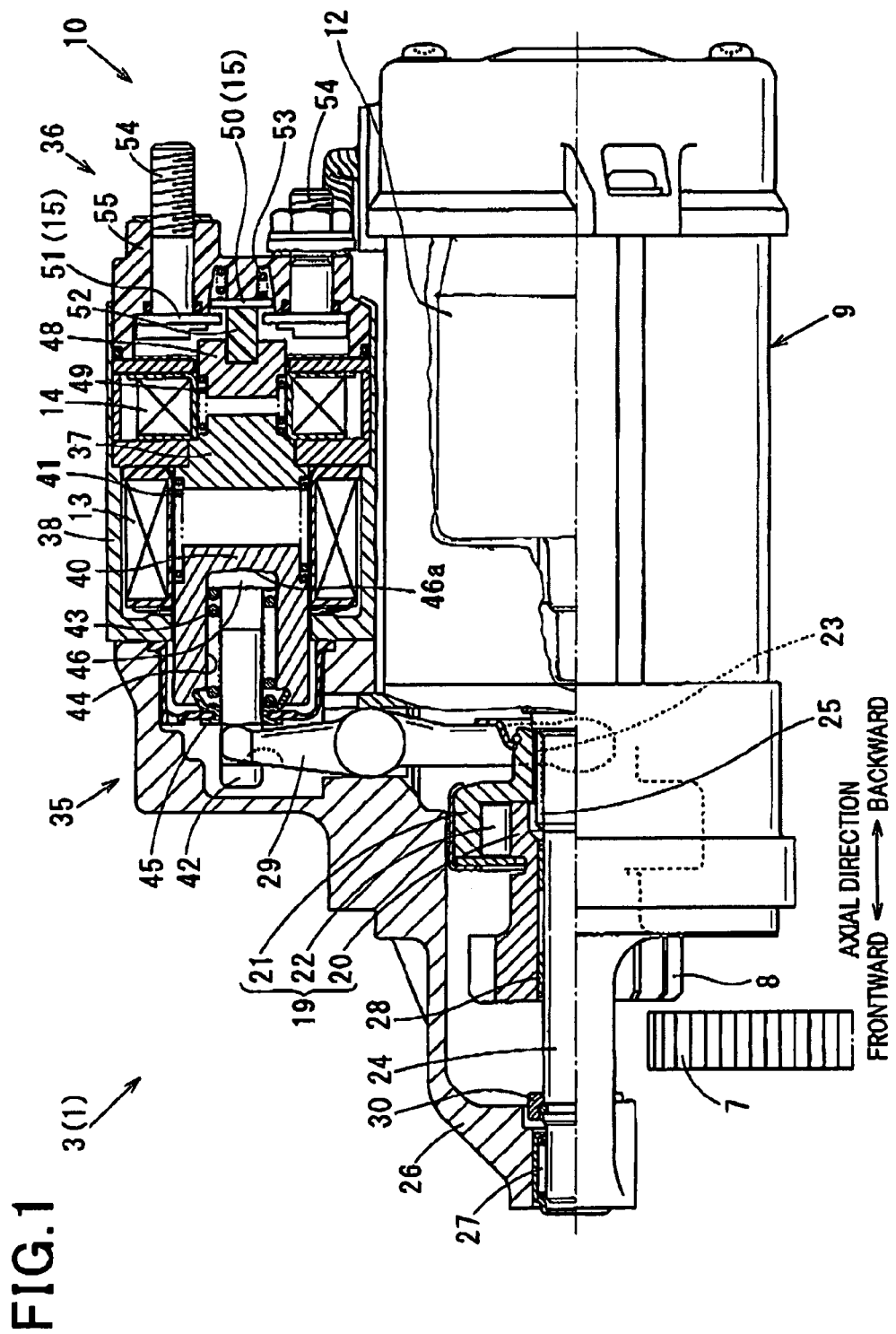
FIG. 1 is a partially cross sectional view which shows the structure of a starter for an engine according to an embodiment of the invention.
Figure 2:
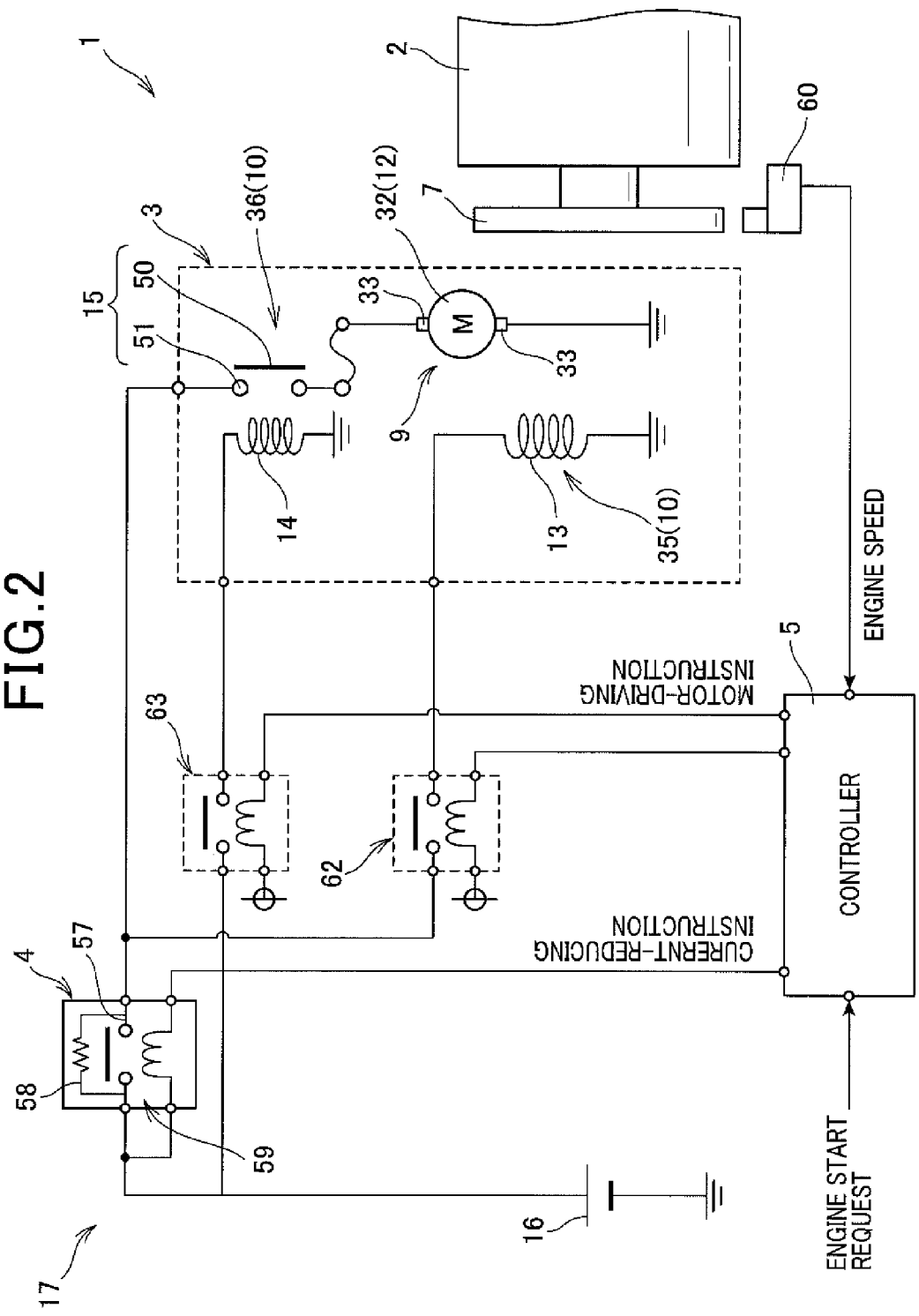
FIG. 2 is a block diagram which illustrates an engine starting of an embodiment of the invention.

Referring to the drawings, wherein like reference numbers refer to like parts in several views, particularly to FIGS. 1 and 2, there is shown an engine starting system 1 which is installed in an engine compartment of an automotive vehicle to start an engine 2 such as an internal combustion engine. The engine starting system 1 is equipped with a starter 3, a current increasing and decreasing circuit 4, and a controller 5.

The starter 3 generally includes a pinion 8, an electric motor 9, and an electromagnetic relay 10. The pinion 8 is moved into mesh with a ring gear 7 coupled to the engine 2. The electric motor 9 works to produce torque to rotate the pinion 8. The electromagnetic relay 10 is implemented by an electromagnetic solenoid which works to turn on or off the electric motor 9 and also to move the pinion 8 straight toward the ring gear 7.

An armature 12 of the electric motor 9, coils 13 and 14 installed in the electromagnetic relay 10, a switch 15, and the current increasing and decreasing circuit 4 constitute a starter circuit 17 which uses electric power from a battery 16 to start the engine 2 through the starter 3.

The pinion 8 is moved straight toward the ring gear 7 and then contacts with the ring gear 7 in an axial direction thereof. The pinion 8 is then rotated into mesh with the ring gear 7 and kept rotating to turn the ring gear 7 for starting the engine 2.

The pinion 8 is formed integrally with an inner 20 that is an output rotating member of a one-way clutch 19. The pinion 8 is thrust out straight by the electromagnetic relay 10 along with the one-way clutch 19.

The one-way clutch 19 is equipped with the inner 20, an outer 21, and rollers 22. The inner 20 and the outer 21 have formed therebetween wedge-shaped chambers in which the rollers 22 are disposed. Each of the rollers 22 is urged by a clutch spring (not shown) to a narrower space in one of the wedges-shaped chambers to lock the inner 20 and the outer 21 together through the rollers 22.

The outer 21 has disposed on an inner periphery thereof a screw spline 23 which meshes with a screw spline 25 disposed on an outer periphery of a drive shaft 24. The drive shaft 24 is coupled coaxially with an output shaft (not shown) of the electric motor 9 and retained to be rotatable by a housing 26 through a bearing 27. Torque, as produced by the electric motor 9, is transmitted to the drive shaft 24 through the engagement of the screw splines 23 and 25. Bearings 28 are also disposed between the drive shaft 24 and a combination of the pinion 8 and the inner 20.

With the above arrangements, the pinion 8 and the one-way clutch 19 are advanced along the drive shaft 24 by thrust force, as transmitted from the electromagnetic relay 10 through a shift lever 29, so that the pinion 8 contacts the ring gear 7. The pinion 8 and the one-way clutch 19 are rotated by torque, as transmitted to the drive shaft 24 from the electric motor 9, thereby causing the pinion 8 to engage and rotate the ring gear 7 to crank the engine 2. Specifically, the torque, as transferred from the electric motor 9 to the outer 21, is transmitted to the inner 20 and the pinion 8 through the rollers 22 to start the engine 2.

After start-up of the engine 2, the torque, as produced by the engine 2, rotates the pinion 8 and the inner 20 faster than the outer 21. This causes the rollers 22 to compress the clutch springs and move to wider spaces in the wedge-shaped chambers, thereby unlocking the inner 20 and the outer 21. The pinion 8 and the inner 20 then rotate relative to the outer 21. The pinion 8 and the one-way clutch 19 are returned backward by force, as transmitted from the electromagnetic relay 10, so that the pinion 8 disengages from the ring gear 7.

A known planetary gear speed reducer (not shown) is disposed in a torque transmission line between the output shaft of the electric motor 9 and the drive shaft 24. The drive shaft 24 has a stopper 30 mounted thereon between the bearing 27 and the ring gear 7. The stopper 30 works to stop the advancement of the pinion 8.

The electric motor 9 is, as illustrated in FIG. 2, a dc motor equipped with an armature 12, a field (not shown), a commutator 32, and brushes 33. The electromagnetic relay 10 works to energize or deenergize the armature 12.

The electromagnetic relay 10 is made up of a pinion actuator 35 and a motor driver 36. The pinion actuator 35 works to move the pinion 8 back and forth along the drive shaft 24. The motor driver 36 works to turn on or off the electric motor 9. The pinion actuator 35 and the motor driver 36 include coils 13 and 14, respectively. The coils 13 and 14 are energized independently from each other to create individual magnetic circuits.

The pinion actuator 35 and the motor driver 36 are, as can be seen from FIG. 1, disposed coaxially with each other, in other words, aligned with each other. The pinion actuator 35 and the motor driver 36 are also physically oriented to have axes extending parallel to those of the electric motor 9 and the drive shaft 24. The pinion actuator 35 is located on a front side (i.e., the left side, as viewed in FIG. 1) of the axis of the motor driver 36. A stationary core 37 is disposed between the coils 13 and 14 at a location where magnetic fluxes, as produced by the coils 13 and 14, pass through the stationary core 37. The electromagnetic relay 10 also includes a yoke 38 which also serves as a one-piece outer shell covering both the coils 13 and 14.

The pinion actuator 35 is made up of the coil 13, the stationary core 37, the yoke 38, a moving core 40, a return spring 41, a joint 42, and a drive spring 43.

The moving core 40 is disposed inside the coil 13 and moved backward by a magnetic attraction, as created by the coil 13, toward the stationary core 37. Specifically, such a magnetic attraction is transmitted through the shift lever 29 and then exerted as the thrust force on the pinion 8, so that the pinion 8 is thrust toward the ring gear 7.

The return spring 41 is disposed in a compressed form between the stationary core 37 and the moving core 40 to urge the moving core 40 away from the stationary core 37 in the axial direction of the electromagnetic relay 10. The pressure, as produced by the return spring 41, is transmitted through the shift lever 29 to urge the pinion 8 away from the ring gear 7.

The joint 42 has a head in which an end of the shift lever 29 is fit. The joint 42 is disposed in a mount hole 44 formed in the moving core 40 with the head exposed outside the moving core 40.

The joint 42 is movable in the mount hole 44 relative to the stationary core 40 in an axial direction (i.e., a lengthwise direction) thereof.

The drive spring 43 is arranged in a compressed form between a spring seat 45 attached in a unified form to the moving core 40 and a spring seat 46 mounted on the rear end of the joint 42. The drive spring 43 urges the joint 42 in a backward direction (i.e., the rightward direction in FIG. 1) so as to bring the spring seat 46 into constant contact with the bottom surface (i.e., a rear end) 46a of the mount hole 44.

When the pinion 8 is pushed by backward movement of the moving core 40 into contact with the ring gear 7, and then the moving core 40 is further attracted in the backward direction, as viewed in FIG. 1, it will cause the spring seat 46 to leave the bottom surface 46a, thereby compressing the drive spring 43 further to press the pinion 8 frontward. Subsequently, when being rotated by the electric motor 9, the pinion 8 is brought by the pressure, as produced by the drive spring 43, into mesh with the ring gear 7. The pinion 8 advances until it hits the stopper 30.

The motor actuator 36 is equipped with the coil 14, the stationary core 37, the yoke 38, a moving core 48, a return spring 49, the switch 15. The switch 15 is made up of a moving contact 50 and fixed contacts 51.

The moving core 48 is disposed inside the coil 14 and moved frontward by a magnetic attraction, as created by the coil 14, toward the stationary core 37. The moving core 48 is joined to the moving contact 50 through a resinous rod 52. The movement of the moving contact 48 toward the stationary core 37 will cause the moving contact 50 to make an electrical contact with the fixed contacts 51 to close the switch 15.

The return spring 49 is disposed inside the coil 14 in a compressed form between the stationary core 37 and the moving core 48 to urge the moving core 48 away from the stationary core 37 backward in the axial direction of the electromagnetic relay 10. When the coil 14 is deenergized, so that the magnetic attraction which urges the moving core 48 toward the stationary core 37 disappears, the pressure, as produced by the return spring 49, works to move the moving contact 50 away from the fixed contacts 51, thereby opening the switch 15.

When the switch 15 is in the closed state, the moving contact 50 is urged by a contact spring 53 frontward into constant contact with the fixed contacts 51. Terminal bolts 54 which electrically lead to the battery 16 and the armature 12 are joined to the fixed contacts 51, respectively. A rear end of the electromagnetic relay 10 is closed by a resinous cover 55 to define a chamber in which the switch 15 is installed.

The current increasing and decreasing circuit 4 is one of component parts of the starter circuit 17 and works to increase or decrease the amount of current to be supplied to the armature 12 and the coil 13. The current increasing and decreasing circuit 4 is, for example, made up of two branch lines 57 and 58 connected parallel to each other and a switch 59 disposed in the branch line 57. The branch lines 57 and 58 have resistances different from each other. The branch line 58 will also be referred to as a higher-resistance branch line, while the branch line 57 will also be referred to as a lower-resistance branch line.

When the switch 59 is closed, a high current which passes through the branch line 57 is enabled to be supplied to the armature 12 and the coil 13. Alternatively, when the switch 59 is opened a low current which passes through the branch line 58 is enabled to be supplied to the armature 12 and the coil 13. The switch 59 is of a normally closed type which is opened in response to an on-signal outputted from the controller 5. Such an on-signal will also be referred to as a current-reducing instruction below.

Specifically, when the current increasing and decreasing circuit 4 receives the current-reducing instruction from the controller 5, it enables the amount of current to be supplied to the armature 12 and the coil 13 to be decreased. Alternatively, when the current increasing and decreasing circuit 4 does not receive the current-reducing instruction, it enables the amount of current to be supplied to the armature 12 and the coil 13 to be increased.

The controller 5 is implemented by an electronic control unit (ECU) which receives outputs from sensors to perform operations or control tasks and output instruction signals. For example, when a vehicle occupant turns on an ignition to output a request to start the engine 2 (which will also be referred to as an engine restart request), the controller 5 is responsive to the engine restart request to output the instruction signal to actuate the starter 3. One of the sensors which produce the outputs to the controller 5 is, for example, an engine speed sensor 60 which measure the speed of the engine 2.

The starter circuit 17 has installed therein switches 62 and 63 which turns on or off the coils 13 and 14, respectively. The controller 5 is responsive to the engine restart request to output on-signals in sequence to close the switches 62 and 63. The coils 13 and 14 are then energized in sequence to move the pinion 8 straight into contact with the ring gear 7, to rotate the pinion 8 to engage the ring gear 7, and to rotate the ring gear 7 for cranking the engine 2. The on-signal outputted from the controller 5 to the switches 62 and 63 will also be referred to as a pinion-moving instruction and a motor-driving instruction below.

The controller 5 outputs the motor-driving instruction and the current-reducing instruction to reduce the amount of current to be supplied to the armature 12, thereby avoiding the inrush current. After an elapse of time consumed between the output of the motor-driving instruction and the current-reducing instruction and convergence of the inrush current (which will also be referred to as inrush current convergence time below), the controller 5 stops outputting the current-reducing instruction.

In order to accelerate the restart of the engine 2 after an idle-stop of the engine 2, the controller 5 is capable of operating in a preset mode wherein the pinion-moving instruction is outputted to bring the pinion 8 into mesh with the ring gear 7 before a complete stop of the engine 2 following automatic stop of burning of fuel in the engine 2 in an idle stop mode. The controller 5 in this embodiment commences the preset mode when the speed of the engine 2 has dropped below a given value (which will also be referred to as a preset mode instruction value).

When commencing the preset mode, the controller 5 outputs the current-reducing instruction along with the pinion-moving instruction to decrease the amount of current supplied to the coil 13.

Figure 3A:
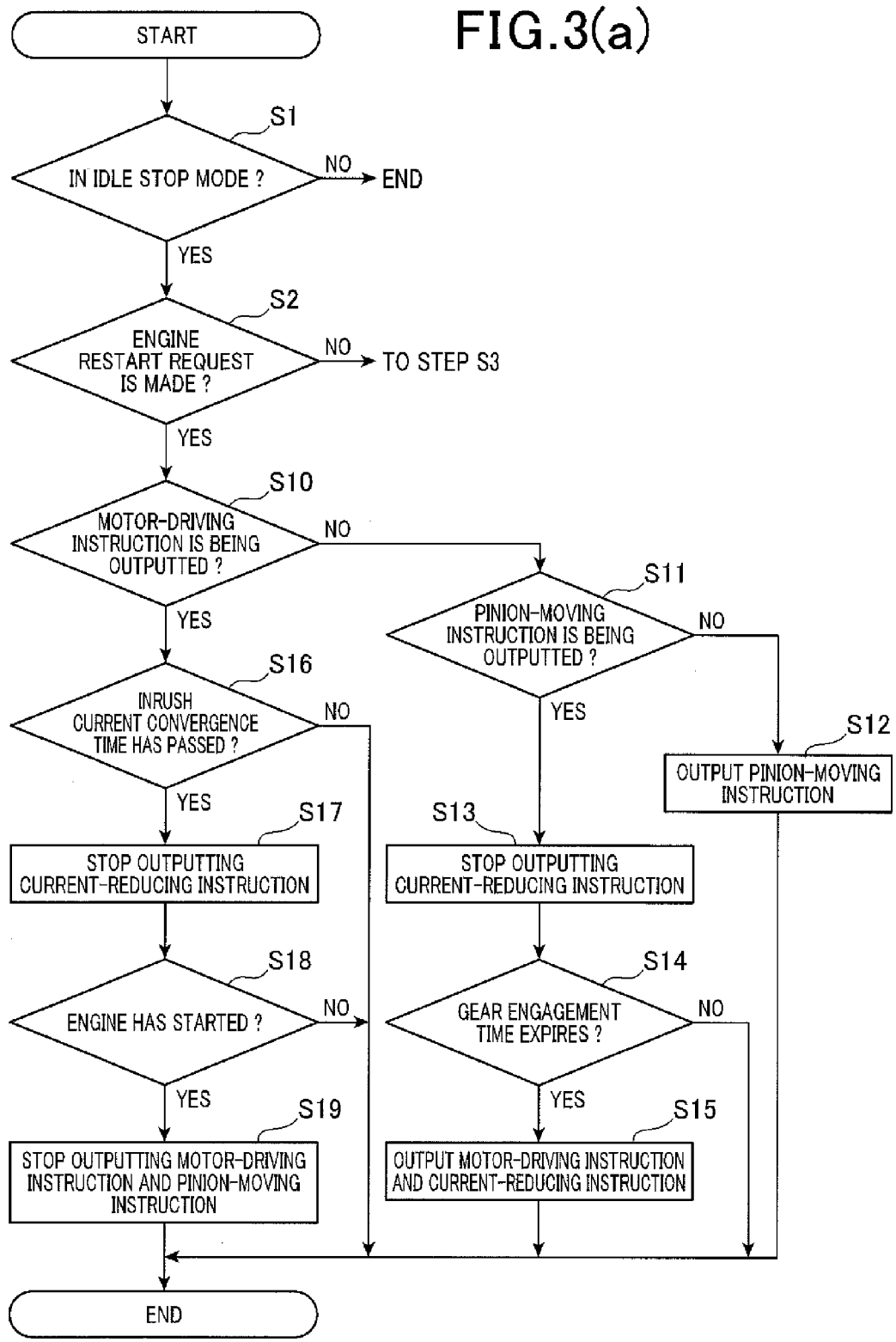
FIGS. 3(a) and 3(b) show a flowchart of a sequence of logical steps or engine restart program to be executed cyclically by the engine starting system of FIG. 2.
Figure 3B:
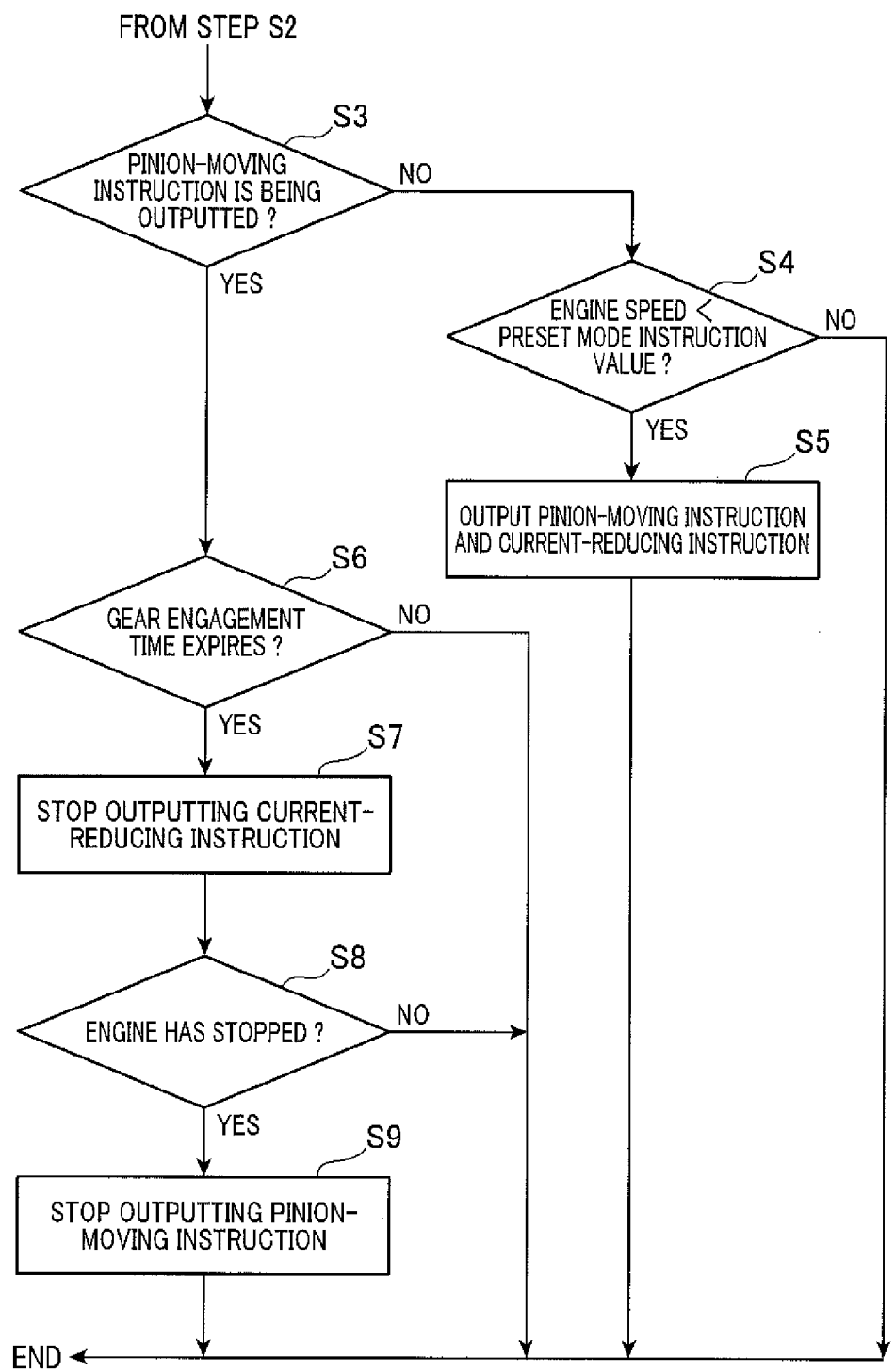
Figure 4A:
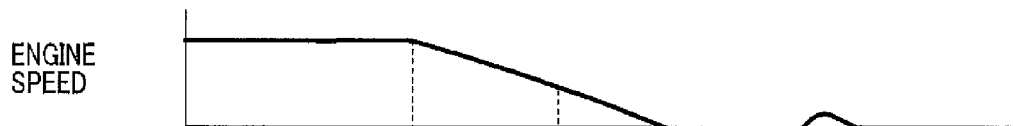
FIGS. 4(a) to 4(g) are time charts for demonstrating operations of the engine starting system of FIG. 2 in the case where a pinion engages a ring gear in a preset mode, after which an engine restart request is not made, so that an engine stops.
Figure 4B:
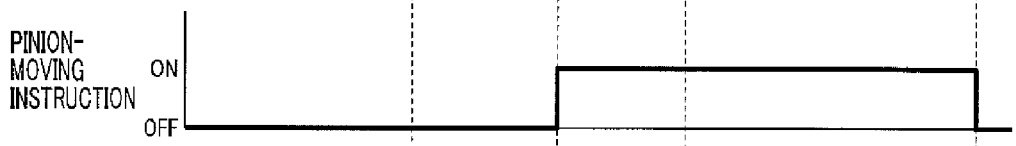
Figure 4C:
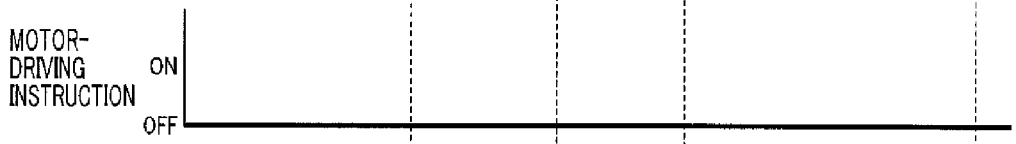
Figure 4D:
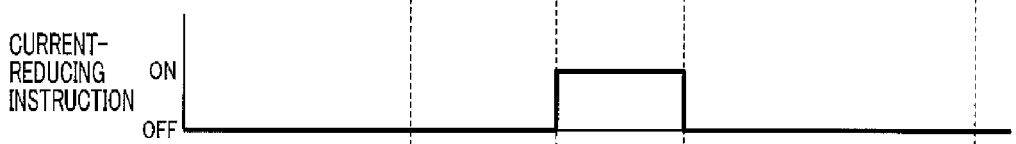
Figure 4E:
Figure 4F:
Figure 4G:
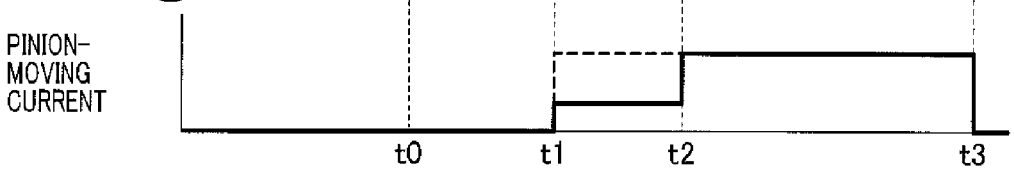

When the engine restart request is made during the preset mode, the controller 5 stops outputting the current-reducing instruction to the current increasing and decreasing circuit 4. FIGS. 3(a) and 3(b) show a flowchart of a sequence of logical steps or engine restart program to be executed cyclically by the engine starting system 1. This program is to minimize mechanical noise (i.e., the axial impact nose) arising from physical contact of the pinion 8 with the ring gear 7 in the axial direction (i.e., a direction in which the pinion 8 travels straight) in the preset mode.

After entering the engine restart program of FIGS. 3(a) and 3(b), the routine proceeds to step S1 wherein it is determined whether the idle stop mode is now entered or not. If a YES answer is obtained meaning that the engine starting system 1 is in the idle stop mode, then the routine proceeds to step S2. Alternatively, if a NO answer is obtained, then the routine terminates.

In step S2, it is determined whether the engine restart request has been made or not. When the engine restart request is made during the idle stop mode, the controller 5 gives priority to a quick restart of the engine 2 instead of minimizing the axial impact noise. If a NO answer is obtained meaning that the engine restart request is not made, then the routine proceeds to steps S3 to S9 in order to minimize the axial impact noise. Alternatively, if a YES answer is obtained meaning that the engine restart request has been made, then the routine proceeds to steps S10 to S19 in order to accelerate the restart of the engine 2.

In step S3, it is determined whether the pinion-moving instruction is now being outputted or not. This determination is made to determine whether the pinion 8 is now traveling straight toward the ring gear 7, that is, the preset mode is now entered or not. If a NO answer is obtained meaning that the pinion-moving instruction is not outputted, then the routine proceeds to steps S4 and S5 to commence the preset mode, that is, output the pinion-moving instruction. Alternatively, if a YES answer is obtained, then the routine proceeds to steps S6 to S9 to continue and then terminate the preset mode.

In step S4, it is determined whether the speed of the engine 2 is lower than the preset mode instruction value or not. This determination is made to determine whether the preset mode is permitted to be entered or not. If a YES answer is obtained meaning that the speed of the engine 2 is lower than the preset mode instruction value, then the routine proceeds to step S5. Alternatively, if a NO answer is obtained, then the routine terminates.

In step S5, the controller 5 starts to output the pinion-moving instruction and the current-reducing instruction. The coil 13 is then energized to thrust the pinion 8 toward the ring gear 7. The amount of current to be supplied to the coil 13 is reduced by the current increasing and decreasing circuit 4 to lower the axial impact noise.

In step S6, it is determined whether a gear engagement time has passed or not. The gear engagement time is a time required between the start of movement of the pinion 8 and engagement of the pinion 8 with the ring gear 7. Specifically, in step S6, the controller 5 counts time elapsed from the output of the pinion-moving instruction and determines whether such an elapsed time has exceeded the gear engagement time or not, thereby checking whether the pinion 8 has engaged the ring gear 7 completely or not.

If a YES answer is obtained in step S6 meaning that the gear engagement time has passed, the routine proceeds to steps S7 to S9 for terminating the preset mode. Alternatively, if a NO answer is obtained, then the routine permits the preset mode to be continued and terminates. Until the gear engagement time passes since the start of movement of the pinion 8, the pinion 8 will hit the ring gear 7 in the axial direction thereof to generate the axial impact noise. Subsequently, the pinion 8 is rotated to an angular position where the pinion 8 is enabled to mesh with the ring gear 7 and then engages the ring gear 7 completely.

In step S7, the controller 5 stops outputting the current-reducing instruction. This causes the amount of current supplied to the coil 13 to be increased. The pinion actuator 35 continues to produce the magnetic attraction to push the pinion 8 against the pressure, as produced by the return spring 41, thereby keeping the pinion 8 engaging the ring gear 7.

The routine then proceeds to step S8 wherein it is determined whether the engine 2 has stopped or not, that is, whether the ring gear 7 has stopped rotating or not. If a YES answer is obtained meaning that the engine 2 has stopped, the controller 5 concludes that the pinion 8 will not be disengaged from the ring gear 7 even if the pinion actuator 35 stops producing the magnetic attraction. The routine then proceeds to step S9 wherein the controller 5 stops outputting the pinion-moving instruction. Alternatively, if a NO answer is obtained meaning that the engine 2 is still rotating, the controller 5 concludes that the pinion actuator 35 needs to continue to produce the magnetic attraction for keeping the pinion 8 engaging the ring gear 7. The routine terminates this program execution cycle and then returns back to step S1.

Steps S10 to S19 are to start the engine 2 quickly in response to the engine restart request without performing tasks to minimize the axial impact noise.

Specifically, in step S10, it is determined whether the motor-driving instruction is being outputted or not. This determination is made to determine whether the electric motor 9 has been already actuated to rotate the pinion 8 in a previous cycle of execution of the engine restart program or not, that is, whether the pinion 8 is rotating the ring gear 7 in engagement therewith or not.

If a NO answer is obtained in step S10 meaning that the motor-driving instruction is not being outputted, then the routine proceeds to steps S11 to S15. Alternatively, if a YES answer is obtained, then the routine proceeds to steps S16 to S19 for completing the restart of the engine 2.

In step S11, it is determined whether the pinion-moving instruction is being outputted or not. This determination is made to determine whether the coil 13 of the pinion actuator 35 is being energized to generate the magnetic attraction or not regardless of the preset mode performed in a previous cycle of execution of the engine restart program. If a NO answer is obtained in step S11 meaning that the pinion-moving instruction is not being outputted, then the routine proceeds to step S12 wherein the controller 5 starts to output the pinion-moving instruction to thrust the pinion 8 toward the ring gear 7. The routine then terminates. Alternatively, if a YES answer is obtained in step S11 meaning that the pinion-moving instruction is being outputted, then the routine proceeds to steps S13 to S15 for actuating the electric motor 9.

In step S13, the controller 5 stops outputting the current-reducing instruction. The operation in step S13 is to release the preset mode in which the amount of current supplied to the coil 13 is reduced to slow the straight movement of the pinion 8 and then increase the amount of current supplied to the coil 13.

The routine then proceeds to step S14 wherein it is determined whether the gear engagement time has passed or not. If a YES answer is obtained meaning that the gear engagement time has passed, then the routine proceeds to step S15 for actuating the electric motor 9. Alternatively, if a NO answer is obtained, then the routine terminates while keeping the amount of current supplied to the coil 13 increased.

Even if it is determined in step S14 that the gear engagement time has passed in the preset mode regardless of the output of the pinion-moving instruction in step S12, then the routine proceeds to step S15.

In step S15, the controller 5 starts to output the motor-driving instruction and the current-reducing instruction. The routine then terminates. The electric motor 9 starts to rotate the pinion 8 to crank the engine 2 through the ring gear 7. The current increasing and decreasing circuit 4 decreases the amount of current supplied to the armature 12, thereby minimizing the inrush current.

If a YES answer is obtained in step S10 meaning that the motor-driving instruction is being outputted, then the routine proceeds to step S16 wherein it is determined whether the inrush current convergence time has passed or not. If a YES answer is obtained, then the routine proceeds to step S17 wherein the controller 5 stops outputting the current-reducing instruction. Alternatively, if a NO answer is obtained, then the routine terminates while keeping the amount of current supplied to the armature 12 decreased.

After step S17, the routine proceeds to step S18 wherein it is determined whether the engine 2 has started or not. If a YES answer is obtained meaning that the engine 2 has started, then the routine proceeds to step S19 wherein the controller 5 stops outputting the motor-driving instruction and the pinion-moving instruction. Alternatively, if a NO answer is obtained, then the routine terminates while continuing to output the motor-driving instruction and the pinion-moving instruction.

The operation of the engine starting system 1 will also be described below with reference to FIGS. 4(a) to 4(g) and FIGS. 5(a) to 5(g).

Time charts in FIGS. 4(a) to 5(g) represent time-sequential changes in instruction and parameters used in executing the engine restart program of FIGS. 3(a) and 3(b). FIGS. 4(a) to 4(g) demonstrate the case where the pinion 8 engages the ring gear 7 in the preset mode, after which the engine restart request is not made, so that the engine 2 stops. FIGS. 5(a) to 5(g) demonstrate the case where the pinion 8 engages the ring gear 7 in the preset mode, after which the engine restart request is made before complete stop of the engine 2.

Referring to FIGS. 4(a) to 4(g), the supply of fuel to the engine 2 is cut, so that the engine 2 stops at time t0. The speed of the engine 2, thus, start dropping. Devices or actuators of a fuel supply system are deactivated, thus resulting in a rise in voltage at the battery 16.

The speed of the engine 2 decreases below the preset mode instruction value at time t1. The controller 5, therefore, starts to output the pinion-moving instruction and the current-reducing instruction.

The coil 13 then starts to be energized to move the pinion 8 straight toward the ring gear 7. The amount of current flowing through the coil 13 and the amount of current flowing through the armature 12 are expressed by "pinion-moving current" and "motor-driving current" in FIGS. 4(g) and 4(f) and FIGS. 5(g) and 5(f). The amount of current supplied to the coil 13 is decreased by the current-reducing instruction to the current increasing and decreasing circuit 4, so that the pinion 8 moves at a lowered speed. This results in a decreased impact of the pinion 8 on the ring gear 7, thus reducing the axial impact noise.

After an elapse of the gear engagement time, the controller 5 stops outputting the current-reducing instruction at time t2, but continues to output the pinion-moving instruction This causes the amount of current supplied to the coil 13 to be increased, so that the pinion actuator 35 produces an increased degree of magnetic attraction to push the pinion 8 against the pressure, as produced by the return spring 41, thereby keeping the pinion 8 engaging the ring gear 7.

The engine 2 stops completely at time t3. The controller 5 stops outputting the pinion-moving instruction to deenergize the coil 13.

Referring to FIGS. 5(a) to 5(g), the gear engagement time has passed at time t2. The controller 5, thus, stops outputting the current-reducing instruction. Before complete stop of the engine 2, the engine restart request is made at time t4. The controller 5 is responsive to the engine restart request to output the motor-driving instruction and the current-reducing instruction. In other words, the engine restart request is made after the pinion 8 meshes with the ring gear 7, but before the engine 2 stops completely. The controller 5 starts to output the motor-driving instruction and the current-reducing instruction while continuing to output the pinion-moving instruction.

The armature 12 starts to be energized to actuate the electric motor 9, thereby rotating the pinion 8 for cranking the engine 2 through the ring gear 7. The amount of current supplied to the armature 12 is decreased by the current-reducing instruction to the current increasing and decreasing circuit 4, thereby suppressing the inrush current to reduce a voltage drop in the battery 16. The amount of current supplied to the coil 13 will drop temporarily due to the start of energization of the armature 12.

The inrush current convergence time expires at time t5. The controller 5 stops outputting the current-reducing instruction and continues to output the pinion-moving instruction and the motor-driving instruction. The current, thus, continues to flow through the coil 13 and the armature 12, so that the pinion 8 continues to rotate the ring gear 7 without being disengaged from the ring gear 7.

At time t6, the engine 2 starts. The controller 5 stops outputting the pinion-moving instruction and the motor-driving instruction to deenergize the coil 13 and the armature 12. The pinion 8 is, therefore, moved away from the ring gear 7 and then stops.

The engine starting system 1 of this embodiment offers the following advantages.

The current increasing and decreasing circuit 4 is one of components of the starter circuit 17 and works to control the amount of current. The controller 5 outputs the current-reducing instruction to the current increasing and decreasing circuit 4 to decrease the current supplied to the coil 13. This results in a decreased degree of magnetic attraction, as produced by the pinion actuator 35, so that the speed at which the pinion 8 advances toward the ring gear 7 is decreased, thereby reducing the level of the axial impact noise. Such a decrease in speed of the pinion 8 also results in decreases in mechanical wear of the pinion 8 and the ring gear 7 and level of noise resulting from hit of the pinion 8 against the stopper 30.

When performing the preset mode, the controller 5 outputs the current-reducing instruction to the current increasing and decreasing circuit 4.

In the preset mode, the fuel supply system is deactivated to cut the supply of fuel to the engine 2. The vehicle occupants will, therefore, be sensitive to the axial impact noise. In order to reduce such a noise, when entering the preset mode, the controller 5 outputs the current-reducing instruction to the current increasing and decreasing circuit 4 to decrease the amount of current supplied to the coil 13 to slow the movement of the pinion 8, thereby reducing the level of the axial impact nose.

When the engine restart request is made during the preset mode, the controller 5 stops outputting the current-reducing instruction to the current increasing and decreasing circuit 4. This increases the amount of current supplied to the coil 13 to elevate the speed of advancement of the pinion 8, thereby achieving a quick restart of the engine 2.

The current increasing and decreasing circuit 4 is, as described above, installed in the starter circuit 17 to control or decrease the amount of current supplied to the armature 12 in response to the current-reducing instruction outputted from the controller 5. The decrease in current to the armature 12 results in a decrease in inrush current to the armature 12, thus avoiding an instantaneous great drop in voltage at the battery 16 and also reducing the radial impact nose. The installation of the current increasing and decreasing circuit 4 in the starter circuit 17 results in a decrease in production cost of the engine starting system 1 as compared with when separate current-reducing circuits are provided for the armature 12 and the coil 13, respectively.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiment witch can be embodied without departing from the principle of the invention as set forth in the appended claims.

Instead of the current increasing and decreasing circuit 4 installed in the starter circuit 17, the engine starting system 1 may be engineered to include separate circuits which serve to decrease the amount of current applied to the armature 12 and the coil 13, respectively.

The controller 5 may be designed to output the current-reducing instruction to reduce the level of the axial impact noise when the engine starting system 1 is not in the preset mode.

The current increasing and decreasing circuit 4 is made up of the branch lines 57 and 58 which are different in resistance from each other and extend parallel to each other and the switch 57 installed in the branch line 57, but may be designed in another form.

What is claimed is:

1. An engine starting system for an engine, the engine starting system comprising:
    a pinion which is moved in a straight line into engagement with a ring gear coupled to an engine, the pinion rotating the ring gear to start the engine;
    an electromagnetic solenoid which is equipped with a coil, when the coil is energized, the electromagnetic solenoid producing a magnetic attraction to move the pinion straight toward the ring gear;
    a first current increasing and decreasing unit that is a component of an electric circuit including the coil of the electromagnetic solenoid, the first current increasing and decreasing unit configured to selectively increase and decrease an amount of current used to energize the coil; and
    a controller configured to output a first current-reducing instruction to the first current increasing and decreasing unit to reduce the amount of current used to energize the coil, the controller outputting the first current-reducing instruction to reduce the amount of current used to energize the coil while the pinion is moved from a position out of contact with the ring gear to a position in which the pinion engages the ring gear, and then stops outputting the first current-reducing instruction to cause an increase in the amount of current used to energize the coil after the pinion has engaged the ring gear.

2. The engine starting system as set forth in claim 1, wherein the controller operates in a preset mode in which the first current-reducing instruction is outputted to bring the pinion into engagement with the ring gear before a stop of the engine in an idle stop mode, and wherein the controller outputs the first current-reducing instruction to the first current increasing and decreasing unit to reduce the amount of current used to energize the coil when operating in the preset mode.

3. The engine starting system as set forth in claim 2, wherein when an engine restart request is made to start the engine during execution of the preset mode, the controller stops outputting the first current-reducing instruction to the first current increasing and decreasing unit.

4. The engine starting system as set forth in claim 1, further comprising:
    an electric motor which provides torque to rotate the pinion; and
    a second current increasing and decreasing unit that is a component of an electric circuit including an armature of the electric motor and which is configured to selectively increase and decrease an amount of current to be supplied to the armature,
    wherein the controller outputs a second current-reducing instruction to the second current increasing and decreasing unit to reduce the amount of current to be supplied to the armature.

5. The engine starting system as set forth in claim 4, wherein the component of the electric circuit which constitutes the first current increasing and decreasing unit and the component of the electric circuit which constitutes the second current increasing and decreasing unit are implemented by a common circuit component, and wherein the controller outputs a current-reducing instruction to the common circuit component as the first and second current-reducing instructions to reduce the amount of current used to energize the coil and the amount of current supplied to the armature.

6. An engine starting system for an engine, the engine starting system comprising:
    a pinion which is moved in a straight line into engagement with a ring gear coupled to an engine, the pinion rotating the ring gear to start the engine;
    an electromagnetic solenoid which is equipped with a coil, when the coil is energized, the electromagnetic solenoid producing a magnetic attraction to move the pinion straight toward the ring gear;
    a first current increasing and decreasing unit that is a component of an electric circuit including the coil of the electromagnetic solenoid, the first current increasing and decreasing unit configured to selectively increase and decrease an amount of current used to energize the coil; and
    a controller configured to output a first current-reducing instruction to the first current increasing and decreasing unit to reduce the amount of current used to energize the coil, wherein
    the component of the electric circuit which constitutes the first current increasing and decreasing unit includes a higher-resistance branch line and a lower-resistance branch line which have resistances different from each other and are connected in parallel to each other, the lower-resistance branch line having a switch disposed therein, and the controller is configured to open the switch to have an electric current pass through the higher-resistance branch line to decrease the amount of current used to energize the coil.

7. The engine starting system as set forth in claim 6, wherein the controller operates in a preset mode in which the first current-reducing instruction is outputted to bring the pinion into engagement with the ring gear before a stop of the engine in an idle stop mode, and wherein the controller outputs the first current-reducing instruction to the first current increasing and decreasing unit to reduce the amount of current used to energize the coil when operating in the preset mode.

8. The engine starting system as set forth in claim 7, wherein when an engine restart request is made to start the engine during execution of the preset mode, the controller stops outputting the first current-reducing instruction to the first current increasing and decreasing unit.

9. The engine starting system as set forth in claim 6, further comprising:
an electric motor which provides torque to rotate the pinion; and
a second current increasing and decreasing unit that is a component of an electric circuit including an armature of the electric motor and which is configured to selectively increase and decrease an amount of current to be supplied to the armature,
wherein the controller outputs a second current-reducing instruction to the second current increasing and decreasing unit to reduce the amount of current to be supplied to the armature.

10. The engine starting system as set forth in claim 9, wherein the component of the electric circuit which constitutes the first current increasing and decreasing unit and the component of the electric circuit which constitutes the second current increasing and decreasing unit are implemented by a common circuit component, and wherein the controller outputs a current-reducing instruction to the common circuit component as the first and second current-reducing instructions to reduce the amount of current used to energize the coil and the amount of current supplied to the armature.

\* \* \* \* \*